United States Patent [19]

Verhulst

[11] Patent Number: 5,007,715

[45] Date of Patent: Apr. 16, 1991

[54] DISPLAY AND PICK-UP DEVICE FOR STEREOSCOPIC PICTURE DISPLAY

[75] Inventor: Antonius G. H. Verhulst, Eindhoven, Netherlands

[73] Assignee: U.S. Philips Corporation, New York, N.Y.

[21] Appl. No.: 313,666

[22] Filed: Feb. 21, 1989

[30] Foreign Application Priority Data

Mar. 10, 1988 [NL] Netherlands ............. 8800595

[51] Int. Cl.⁵ ............. G02F 1/13; H04N 13/00
[52] U.S. Cl. ............. 350/334; 350/331 R; 350/337; 350/350 S; 358/88; 358/91
[58] Field of Search ......... 350/334, 335, 337, 347 E, 350/331 R, 336, 350 S; 358/3, 88, 230, 231, 213.23, 89, 91, 92

[56] References Cited

U.S. PATENT DOCUMENTS

| | | | |
|---|---|---|---|
| 1,523,436 | 8/1978 | Mears et al. | 358/88 |
| 3,807,831 | 4/1974 | Soref | 350/347 E |
| 4,281,341 | 7/1981 | Byatt | 358/92 |
| 4,431,265 | 2/1984 | Benton | 358/88 X |
| 4,523,226 | 6/1985 | Lipton et al. | 358/88 |
| 4,583,117 | 4/1986 | Lipton et al. | 358/92 |
| 4,709,263 | 11/1987 | Brumage | 358/88 |
| 4,781,440 | 11/1988 | Toda | 350/347 E |
| 4,873,572 | 10/1989 | Miyazaki et al. | 358/88 X |

FOREIGN PATENT DOCUMENTS

| | | | |
|---|---|---|---|
| 0036802 | 3/1980 | Japan | 350/335 |
| 2111798 | 7/1983 | United Kingdom | 358/88 |

Primary Examiner—Stanley D. Miller
Assistant Examiner—Huy K. Mai
Attorney, Agent, or Firm—Bernard Tiegerman

[57] ABSTRACT

For stereoscopic display arbitrarily formed sub-pictures (for example divided into columns) are mixed. This is possible by covering a light-sensitive pick-up unit (CCD) (23) on which the sub-pictures are projected with an LCD (21) in such a way that a 1:1 relation is created between pixels and storage elements. A polarizer (22) arranged between the pick-up unit (23) and the liquid crystal (21) passes sub-pictures determined by electrodes (26, 27), which sub-pictures are read by the pick-up unit. On the display side the sub-pictures are read via an LCD (36) and combined in an analogous manner to a (stereoscopic) overall picture.

15 Claims, 2 Drawing Sheets

DISPLAY AND PICK-UP DEVICE FOR STEREOSCOPIC PICTURE DISPLAY

BACKGROUND OF THE INVENTION

1. Fields of the Invention

The invention relates to a display device for stereoscopic picture display in which information relating to sub-pictures is applied to the display device for displaying a picture composed of the sub-pictures in accordance with a fixed pattern.

The invention also relates to a pick-up device for picking up pictures for stereoscopic display.

2. Description of the Related Art

The principle of stereoscopic display of, for example television pictures is known per se. The picture is split up into two sub-pictures passed on to the left eye and to the right eye, respectively. The viewer wears glasses each passing or not passing one of the two sub-pictures; this is usually effected at the field frequency of the TV picture, with, for example the picture of the odd field being observed by the left eye and the picture of the even field being observed by the right eye.

A display device of this type is described in DE No. 31,46,578A. The display screen is provided with strip-shaped polarizers whose mutual directions of polarization are perpendicular to each other so that the picture is passed on per field in a mutually different polarized manner. With polarized glasses, the viewer then alternately observes the sub-pictures, which results in a three-dimensional picture.

The above-mentioned Patent Specification also states the possibility of changing the direction of polarization per pixel; this change must then be accompanied by a similar change from one sub-picture to the other at the end of the pick-up unit or transmitter.

A drawback of such a device is, inter alia that the (strip-shaped) polarizers are secured to the glass of the display tube in such a way that they correspond to the even and odd lines of the television picture. The position of these lines (or possibly pixels) with respect to the polarizers is, however, not completely fixed but is also determined by the control of the picture height (and picture width); it may change in the course of time due to variation of the deflection and/or the EHT system.

Stereoscopic television picture display can also be realized by displaying the pictures for the left and the right eye alternately via the interlaced (odd and even) fields, whilst an active light shutter switching synchronously with a picture field is placed in front of each eye. However, in this case face flicker occurs at a frequency which is equal to the picture frequency (half the field frequency), i.e. approximately 25 Hz (PAL, SECAM) or 30 Hz (NTSC). This face flicker is experienced as a very troublesome effect, all the more because it is also visible outside the actual picture.

Other systems use two separate picture-generating devices whose pictures are combined to one picture via mirrors or by means of projection. A drawback of these systems is the use of two picture-generating devices and the associated facilities to combine the sub-pictures.

A device of the type described in the opening paragraph is proposed in JP-KoKai No. 58-184929. However, the solution shown in this KoKai requires the use of a picture memory; moreover, the sub-pictures are displayed in an interlaced manner so that face flicker also occurs in this case.

SUMMARY OF THE INVENTION

It is an object of the invention to provide a device of the type described in the opening paragraph which does not require any extra picture memory and can be observed with passive glasses, whilst a number of drawbacks of devices as described hereinbedore do not occur.

Such a device is characterized in that it compises a liquid crystal layer between a picture-generating device and a transparent supporting plate, in which layer unidirectionally polarized light enters from the picter-generating device and in which the direction of polariziation is changed at areas determined by a fixed pattern or a pattern which is complementary thereto.

The direction of polarization is preferable rotated through 90°. The direction of polarization is rotated, for example in twisted nematic cells such as the "90° twistor", but a rotation through 270° is also possible in the case of thicker liquid crystal layers (waveguide principle). The direction of polarization is also rotated in nematic cells based on birefringence, for example with the ECB effect or various STN effects in which the director is rotated within a small distance through angles of between 90° and 300° (SBE effect, HBE effect), but also in ferro-electric cells. With a suitably chosen thickness d it is achieved in the latter cells at a fixed wavelength $\lambda$ that for the difference $\Delta n$ between the normal and abnormal refractive index it holds that $d.\Delta n = \lambda/2$. This provides the possibility of a 90° phase rotation and hence the use of ferro-electrics in the extra liquid crystal layer.

The advantage of a ferro-electric liquid crystal layer is that it has a memory effect so that energization need only take place once.

A first preferred embodiment of a device according to the invention is characterized in that the fixed pattern comprises columns of pixels which are separated by complementary columns of pixels. Alternatively, the fixed pattern comprises, for example, a chess board-like pattern of pixels. Significantly, there is substantially no face flicker, whilst the display device is in principle insensitive to the display sequence of the lines so that the picture-generating device can be driven in the way as described in EP No. 0,217,466.

For a correct display the sub-pictures must be presented in accordance with the above-described pattern (separate columns, chessboard-like pattern). This can be effected electronically, for example when three-dimensinal display of pictures obtained with an electron microscope, three-dimensional computer pictures, or with TV pictures obtained with signals for different cameras are concerned.

The actual picture-generating device may be realized in different manners; it may be both light generating, as in the case of electro-luminescent devices or gas discharge devices, and light modulating, as in the case of, for example liquid crystal layers. When using a liquid crystal device it is possbile to use dynamic scattering. However, a device is preferably chosen whose operation is base on a rotation of the direction of polarization of incident light or on birefringence (waveguide principle, birefringence). In this case the contrast can be enhanced considerably by using a second device with which unwanted effects due to a birefringence can be compensated (the so-called "double cell").

A pick-up device according to the invention, supply the correct information, comprises a light-sensitive pick-up unit provided with picture pick-up elements corresponding to pixels, a liquid crystal layer between two supporting plates being arranged between the optical system and the pick-up unit, in which layer the direction of polarization of at least one of the sub-pictures can be changed at area determined by a fixed pattern or a pattern which is complementary thereto, whilst a polarizer is arranged between the liquid crystal layer and the pick-up unit.

A charge-coupled device (CCD) is preferably used as a pick-up unit. The liquid crystal device (LCD) can be placed substantially directly on the CCD, which leads to small dimensions and a 1:1 relation between pixels and pick-up elements.

BRIEF DESCRIPTION OF THE DRAWINGS

The invention will now be described in greater detail, by way of example, with reference to the accompanying drawings in which.

DETAILED DESCRIPTION OF THE PREFERRED EMBODIMENTS

Figure 1:
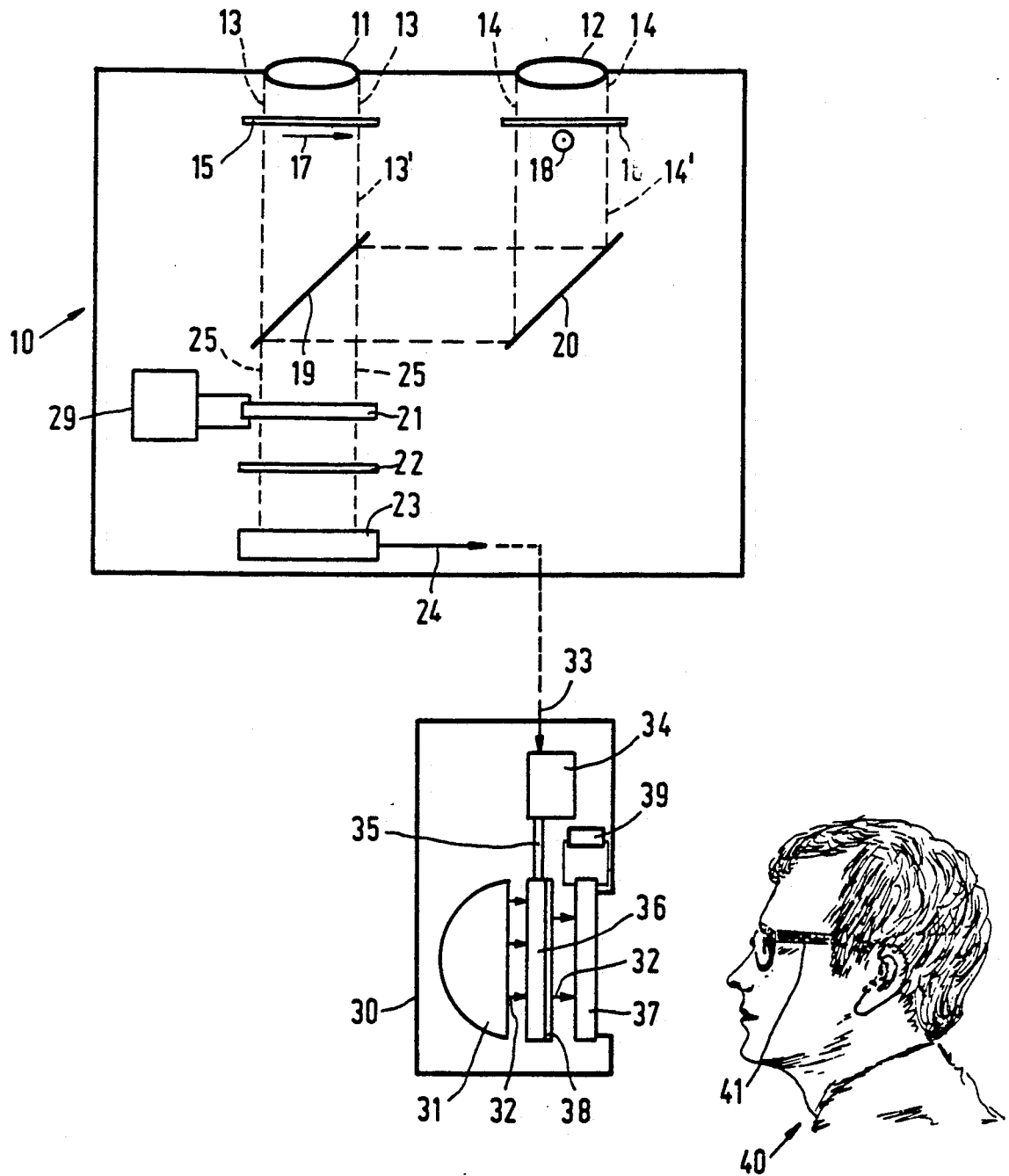
FIG. 1 shows diagrammatically a pick-up and display device according to the invention.

The device of FIG. 1 comprises, inter alia a pick-up device 10 having lenses 11, 12 whose central axes are spaced apart at approximately 6.5 cm. Light which is incident through the lenses 11, 12 (and which originated, for example from a scene to be displayed) and which is denoted by means of dash lines 13, 14 is polarized by polarizers 15, 16. In the relevant example light from the lens 11 is polarized in a direction parallel to the plane of the drawing, whereas light from the lens 12 is polarized in a plane perpendicular to the plane of the drawing (denoted by the arrow 17 and the symbol 18, respectively). The light beam 14' polarized by the polarizer 16 is incident on the mirror 20 at an angle of 45° and is subsequently incident on the semi-transparent mirror 19 which is arranged at an angle of 45° in the path of the light beam 13' polarized by the polarizer 15. At the area of the mirror 19 the two light beams 13', 14' are combined to one light beam 25 which consists of mutually perpendicularly polarized sub-beams and which is subsequently incident on a liquid crystal device 21.

Figure 2:
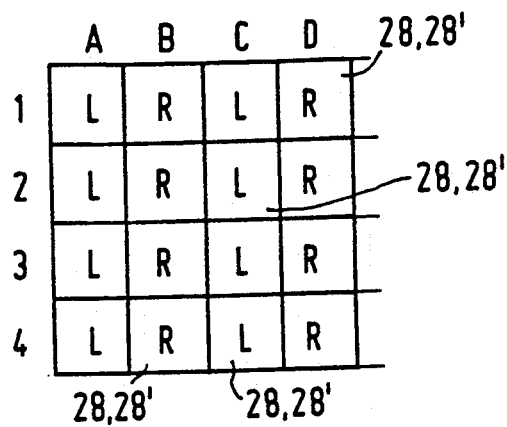
FIG. 2 shows a possible pattern according to which the direction of polarizaiton is locally rotated.
Figure 3A:
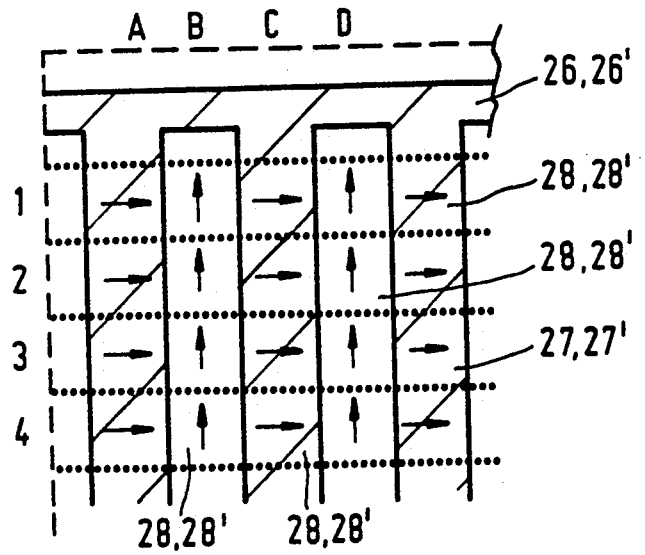
FIG. 3 shows diagrammatically the electrode configuration for driving the liquid crystal layers.

In this example the liquid crystal device 21 comprises in generally known manner a twisted nematic liquid crystal between two supporting plates, with at least one substrate carrying a comb-shaped transparent electrode 26 (see FIG. 3a) provided with teeth 27. The other substrate carries a counter electrode which may be homogeneous or also comb-shaped. The parts of the liquid crystal device 21 covered or left free by the teeth 27 define columns of pixels, viewed in the direction of the light beam 25 (which pixels coincide with pick-up elements in the light-sensitive pick-up unit 23). In the relevant example the pick-up unit 23 comprises a charge-coupled device (CCD) whose charge storage elements are defined at the area of pixels in the liquid crystal device situated above the CCD. The picture picked up (see FIG. 2) may be considered to the split up into pixels 28 arranged in rows 1, 2, 3 . . . and columns A. B, C . . . .

A polarizer 22 passing light polarized in the direction of the arrow 17 is arranged between the liquid crystal device 21 and the pick-up unit 23. The electrode 26 and its counter electrode are energized via a voltage source 29, for example at a square-wave voltage of a sufficiently high frequency to inhibit degradation of the liquid crystal material and/or periodical variation of the transmission. The operation of the liquid crystal device, which in this example comprises liquid crystal material of the twisted nematic type, in such that the direction of polarizaiton of light incident between the teeth 27 of the comb-shaped electrode 26 is rotated through 90° (waveguide mode), whilst the light maintains its direction of polarization at the area of this electrode. The light from the beam 13 is thus passed unhindered at the area of the electrode teeth 27 and is incident on the pick-up elements (charge storage elements) associated with the pixels 28 in the pick-up unit (CCD) at the area of columns A, C . . . . The direction of polarization of the light from the beam 13 is rotated through 90° between the electrode teeth 27 so that this light cannot pass the polarizer 22 and thus does not reach the pick-up unit. The direction of polarizaiton of the light from the beam 14 incident on the liquid crystal device 21 between the teeth 27 is rotated through 90° so that it can pass the polarizer 22 and is incident on the pick-up elements associated with pixels 28 at the area of columns B, D . . . , whilst at the area of the electrode teeth 27 the direction of polarization is not rotated and the light cannot pass the polarizer 22. Dependent on the quantity of light, there is charge storage in the pickup unit (CCD) 23. The charge associated therewith is read, possibly through one or more auxiliary registers, and gives rise to an output signal 24. This signal comprises pixel information per line alternately originating from the left-hand picture (beam 13) and the right-hand picture (beam 14). Instead of a twisted nematic liquid crystal layer, it is alternatively possible to choose a ferro-electric liquid crystal layer. Due to the memory effect this need only be energized once, whereafter the adjustment is maintained.

The signal thus obtained can be used for stereoscopic display by means of a display device 30 (FIG. 1). This device comprises a diffuse light source 31 which generates polarized light 32 via a polarizer (not shown), which light is incident on a liquid crystal display device 36 comprising a liquid crystal between two supporting plates.

An input signal 33, whose information for each line is split up into alternate information for the left eye and for the right eye, is temporarily stored, if required,, and/or amplified in a control unit 34. The information is passed on through control lines 35 to the electrodes on the supporting plates of the display device 36 defining a matrix of pixels. The liquid crystal is, for example again of the twisted nematic type, whilst the direction of polarization is rotated through 90° on non-energized pixels, and the direction of polarization is unchanged at the area of energized pixels. Furthermore the device 36 comprises an analyser 38 which, for example only passes light which is polarized in the same direction as the incident light 32 so that only the light of energized pixels forming part of the two sub-pictures is passed. The direction of polarization of the beam 32 and the analyser 38 is, for example perpendicular to the plane of the drawing.

Instead of a liquid crystal layer of twisted nematic material, it is alternatively possible to use other liquid crystal layers such as ferro-electric liquid crystal layers or layers using the so-called supertwist effect (SBE, HBE) or other electro-optical materials having birefringent properties. The contrast can be enhanced by extending the actual (liquid crystal) cell with a second cell which compensates for unwanted effects of birefringence (so-called double cell).

The liquid crystal device can also be used in the reflection mode. In this case a semiconductor substrate is preferably used as a first supporting plate. The required control electronics can than be integrated in this plate.

In addition to the said light-modulating devices it is alternatively possible to use light-generating systems for the picture-generating device such as electrochrome devices, electro-luminescent screens or gas discharge devices in which the emerging light is polarized, if required.

The light 32 is subsequently incident on a second liquid crystal device 37 which is analogous to the device 21 in the pick-up device 10 and which comprises (at least) one comb-shaped electrode 26′ (FIG. 3a) whose teeth 27′ and the interspaces coincide with columns of pixels 28′ of the picture to be displayed. Perpendicular to the direction of the light 32, the pixels 28′ coincide with the pixels of the liquid crystal display device 36. If the electrodes 26′ and its counter-electrodes are energized, for example by means of the voltage source 39 a sub-picture, for example associated with the pixels 28′ in the columns A, C... and corresponding to the sub-picture for the left eye is passed on without changing the direction of polarization, whereas for the sub-picture associated with the pixels 28′ in the columns B, D... and corresponding to the sub-picture for the right eye the direction of polarization of the light is rotated through 90°.

Figure 3B:
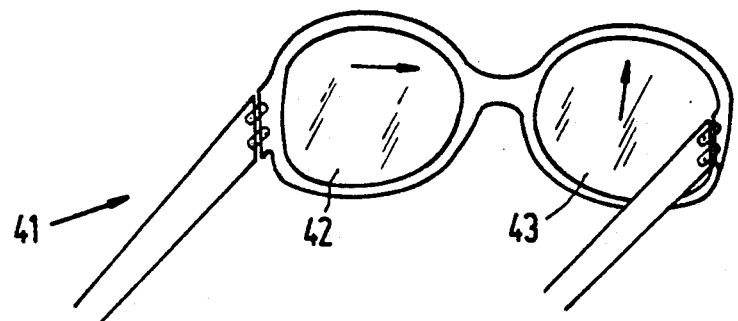

An observer 40 (FIG. 1) wearing spectacles 41 having mutually perpendicularly polarized glasses 42, 43 (FIG. 3b) whose direction of polarization is adapted to the relevant sub-pictures now observes a stereoscopic picture.

The device described has the great advantage, on the pick-up side, of the accurate mutual registration of the electrodes 26 in the liquid crystal device with respect to the columns A, B, C... determined by the storage elements in the pick-up unit (CCD) 23 and, on the display side, a similar mutual registration of the electrodes 26′ with respect to the columns of pixels 28′ in the display device 36. This exact mutual registration is made possible, inter alia by the small thickness of the liquid crystal devices (<6μm). This is notably favorable in the case of small pixels (such as, for example on the pick-up side).

Moreover, the sub-pictures are not mixed line by line but column by column so that face flicker substantially does not occur in the displayed picture. The system is neither sensitive to the sequence of driving the lines so that driving with a mixing of lines as described in EP 0,217,466 is possible.

The pick-up and display device can be used in an integrated manner, for example in a video camera. However, the information can also be temporarily stored before display takes place, or it can be transmitted by means of carrier.

The invention is of course not limited to the examples shown, but many variations are possible within the scope of the invention. For example, a light-sensitive pick-up unit which is different from the charge-coupled device is possible, such as, for example a bipolar memory device. Moreover, other liquid crystal materials are possible, for example liquid crystals in which the direction of polarization is rotated through 270° can be used. Finally, one common supporting plate for the liquid crystal devices 36 and 37 may be sufficient in certain cases. Other display principles such as ELD, ECD and gas discharge have been mentioned, but a matrix of LEDs may also be considered.

I claim:

1. A stereoscopic system, comprising:
   imagining means for forming first and second optical images of a scene and for combining said images in superposed relation, said first image being characterized by a first optical polariation and said second image being characterized by a second optical polarization, different from said first optical polarization; and
   first display means, in optical communication with said imaging means, for formig a first pattern of optical picture elements corresponding to said first image and a second pattern of optical picture elements corresponding to said second image, the optical picture elements of said first and second patterns being characterized by the same optical polarization.

2. The stereoscopic system of claim 1, wherein each of said first and second patterns of optical picture elements includes a plurality of columns of optical picture elements, the columns of said second pattern being interdigitated with the columns of said first pattern.

3. The stereoscopic system of claim 1, wherein said first and second patterns together form a chessboard-like pattern of optical picture elements.

4. The stereoscopic system of claim 1, wherein said first display means includes an electro-optic medium arranged between first and second plates, said plates bearing electrodes which define said first and second patterns.

5. The stereoscopic system of claim 4, wherein said electro-optic medium includes twisted namatic liquid crystal.

6. The stereoscopic system of claim 4, wherein said electro-optic medium includes ferro-electric liquid crystal.

7. The stereoscopic system of claim 1, further comprising light-sensitive, electrical-signal-generating means, in optical communication with said first display means, for producing electrical signals representative of said optical picture elements.

8. The stereoscopic system of claim 7, wherein said light-sensitive, electrical-signal-generating means includes a charge-coupled device.

9. The stereoscopic system of claim 7, still further comprising second display means, capable of electrical communication with said electrical-signal-generating means, for producing a third pattern of optical picture elements corresponding to said first image and a fourth pattern of optical picture elements corresponding to said second image, said third pattern being characterized by an optical polarization which is different from that of said fourth pattern.

10. A stereoscopic display, comprising:
    first display means for producing an optical image representing a combination of first and second optical images of a scene, which optical image representing said combination includes a plurality of optical picture elements, all of which are characterized by the same optical polarization; and
    second display means, in optical communication with said first display means, for producing first and second patterns of optical picture elements corresponding to, respectively, said first and second optical images, said first pattern being characterized by an optical polarization which is different from that of said second pattern.

11. The stereoscopic display of claim 10, wherein each of said first and second patterns includes a plurality of columns of optical picture elements, the columns of said second pattern being interdigitated with the columns of said first pattern.

12. The stereoscopic display of claim 10, wherein said first and second patterns together form a chessboard-like pattern of optical picture elements.

13. The stereoscopic display of claim 10, wherein said second display means includes an electro-optic medium arranged between first and second plates, said plates bearing electrodes which define said first and second patterns.

14. The stereoscopic display of claim 13, wherein said electro-opic medium includes twisted nematic liquid crystal.

15. The stereoscopic display of claim 13, wherein said electro-optic medium includes ferro-electric liquid crystal.

* * * * *